BALANCE TESTING APPLIANCE

Original Filed July 20, 1945 7 Sheets-Sheet 1

INVENTORS
Ira A. Weaver
Clyde H. Phelps
By: Andrus & Scales Atty.

BALANCE TESTING APPLIANCE
Original Filed July 20, 1945 7 Sheets-Sheet 2
Fig. 12.
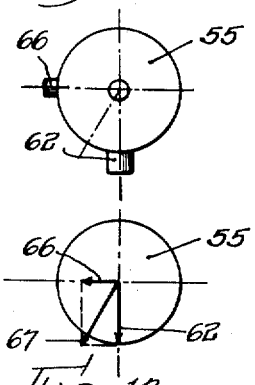
Fig. 13
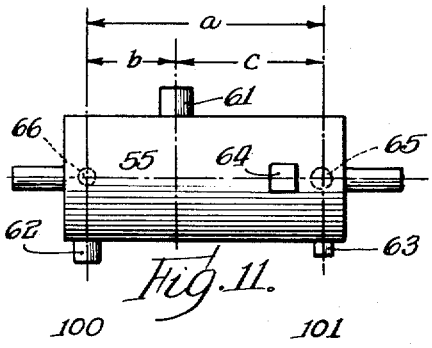
Fig. 11.
Fig. 14.
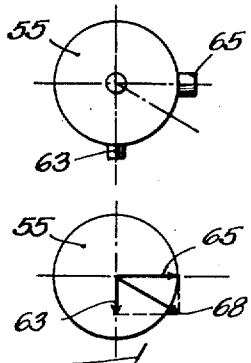
Fig. 15.
Fig. 16.
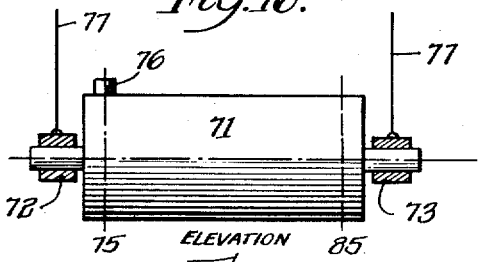
Fig. 17.
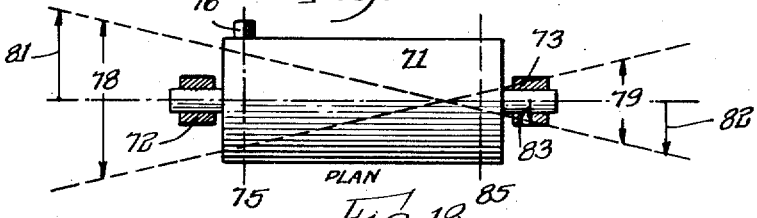
Fig. 18
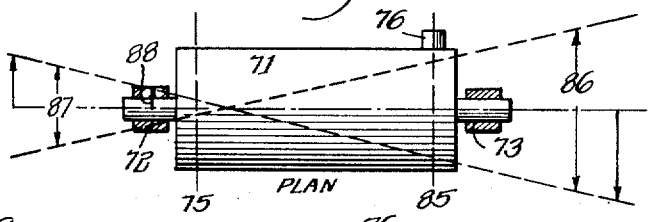
Fig. 19.
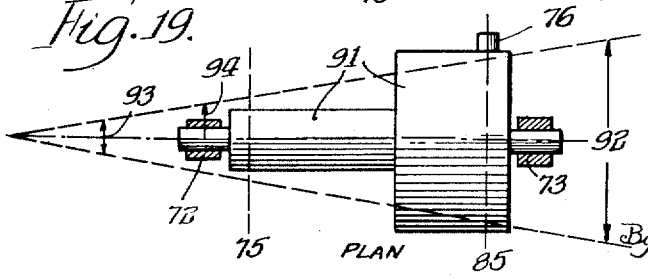
INVENTORS.
Ira A. Weaver
Clyde H. Phelps
By Andrus & Sealey Atty.

BALANCE TESTING APPLIANCE

Original Filed July 20, 1945 7 Sheets-Sheet 3

INVENTORS
Ira A. Weaver
Clyde H. Phelps
By: Andrus & Sculco Atty.

BALANCE TESTING APPLIANCE

Original Filed July 20, 1945 7 Sheets-Sheet 4

INVENTORS.
Ira A. Weaver
Clyde H. Phelps
By Andrus & Sealer attys

BALANCE TESTING APPLIANCE

Original Filed July 20, 1945 7 Sheets-Sheet 5

INVENTORS
Ira A. Weaver
Clyde H. Phelps
By Rudnick & Sneden Atty.

BALANCE TESTING APPLIANCE

Original Filed July 20, 1945 7 Sheets-Sheet 6

INVENTORS.
Ira A. Weaver
Clyde H. Phelps
By: Andrus & Sceales Atty.

BALANCE TESTING APPLIANCE

Original Filed July 20, 1945 7 Sheets-Sheet 7

INVENTORS.
Ira A. Weaver
Clyde H. Phelps
By: Andrus & Sceales Atty.

Reissued Feb. 16, 1954

Re. 23,785

UNITED STATES PATENT OFFICE 23,785

BALANCE TESTING APPLIANCE

Ira A. Weaver and Clyde H. Phelps, Springfield, Ill., assignors, by mesne assignments, to Gisholt Machine Company, Madison, Wis., a corporation of Wisconsin Original No. 2,487,035, dated November 1, 1949, Serial No. 606,050, July 20, 1945. Application for reissue October 30, 1950, Serial No. 192,992

27 Claims. (Cl. 73—66)

Matter enclosed in heavy brackets [ ] appears in the original patent but forms no part of this reissue specification; matter printed in italics indicates the additions made by reissue.

This invention concerns certain valuable betterments in balance testing machines such as are used to determine the amount and location of unbalance in a suitably supported revolving rotor whereby the latter is tested as to its dynamic equilibrium and the degree of the latter is indicated by suitable means. The invention is useful to analyze the unbalance of similar rotors so that suitable corrective steps may be taken to bring them to dynamic balance.

An object of the invention is to provide an appliance of this kind which is relatively simple in structure, which is reliable in results, which is of comparatively low cost, which is unlikely to become damaged or injured in ordinary service and which is easily operated.

In order to understand the invention, it is well to deal initially with some fundamental elemental balancing principles and that course will be followed.

In the drawings, forming a part of this specification, and to which reference should be had in connection with the succeeding description:

Figures 1 to 23 inclusive present various diagrams;

Figure 1:
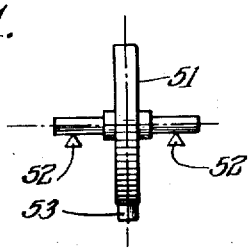

By reference to these drawings, it will be noted that Figure 1 represents a disc 51, the shaft of which is mounted on two, parallel, horizontal, V bars or rails 52, 52, this disc being in complete balance except that a weight 53 has been attached to the rim thereof, as illustrated, causing the disc to roll on the rails by reason of the fact that the weight seeks its lowermost position, as shown.

Figure 2:
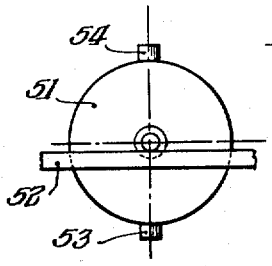

As indicated, in Figure 2, another weight 54 of the same value has been attached to the disc in the same plane and diametrically opposite weight 53 to bring the disc to complete static balance, thereby removing its tendency to roll.

Figure 3:
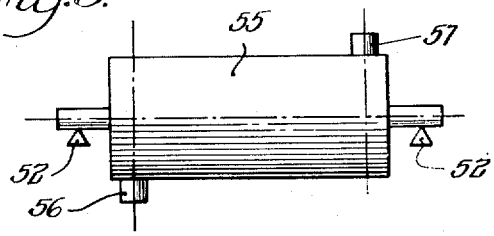
Figure 4:
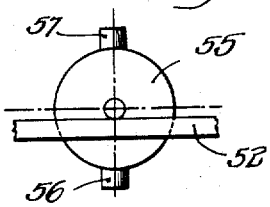

Figures 3 and 4 portray a cylinder 55, similarly mounted and in complete static balance, as the two weights 56 and 57 are of equal value and attached to the perfectly balanced cylinder in the same plane though offset longitudinally of the cylinder, but upon rotation the cylinder is not in dynamic balance.

Figure 5:
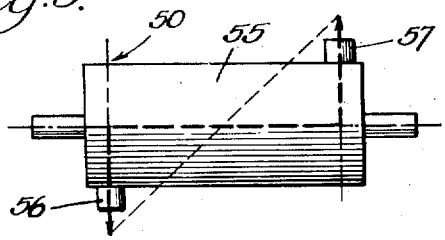
Figure 6:
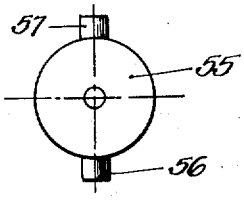

Figures 5 and 6 present the same cylinder and weight combination as in Figures 3 and 4 and upon rotation of such cylinder, if the latter is freely suspended, the two weights will cause the ends of the cylinder to oscillate in opposite directions, and because the centrifugal force of weight 56 in the direction of its arrow is the opposite of that of weight 57 in the direction of its arrow, the cylinder is diametrically unbalanced.

However, if weight 57 be removed and attached to the cylinder at point 50 in the transverse plane of weight 56 complete balance will be obtained.

Figure 8:
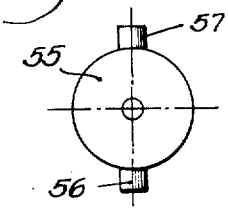
Figure 7:
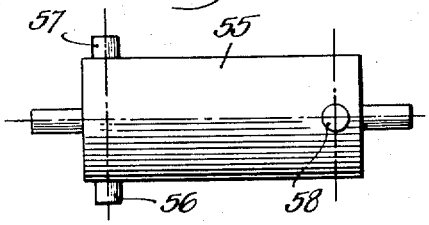
Figure 9:
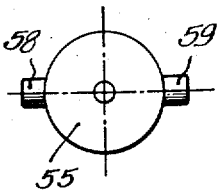

Figures 7, 8 and 9 illustrate the same cylinder 55 fitted with unbalance weight 56 corrected by weight 57 opposite and in the same plane and an unbalance weight 58 corrected by weight 59 in the same plane, this cylinder, therefore, being in complete balance both statically and dynamically.

Figure 10:
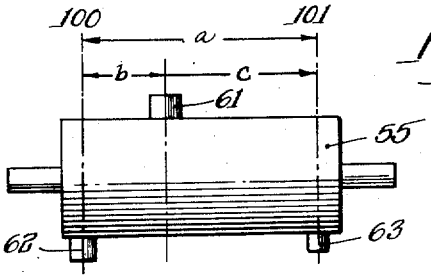

Figure 10 represents the same cylinder 55 with transverse correction planes selected at 100 and 101, but the unbalance weight 61 is not in either correction plane and, therefore, if the two weights, 62 in correction plane 100, and 63 in correction plane 101, whose sum is equal to that of weight 61, were removed and a weight equal to that of weight 61 were attached 180 degrees around the cylinder from weight 61 and in either correction plane, static balance would be obtained but dynamic unbalance would be created. With relation to such statically balanced cylinder, weight 62 multiplied by the distance *b* equals weight 63 multiplied by the distance *c* and consequently the forces are in balance opposite weight 61 and the cylinder is in complete balance.

Figures 11, 12, 13, 14 and 15 show the same cylinder as presented in Figure 10 with the weight 61 balanced by the weights 62 and 63 in the two correction planes 100 and 101 and with another unbalance weight 64 balanced by two additional weights 65 and 66 also in the two correction planes 100 and 101. The two correction weights 62 and 66 in correction plane 100 may be replaced by a single weight of resultant value located at position 67 as indicated in Figure 13 and the correction weights 63 and 65 in correction plane 101 may be replaced by a single weight of resultant value located at position 68 in correction plane 101 and then the cylinder would be in complete balance.

It follows from the foregoing that any rigid rotor may be brought to complete balance (both static and dynamic) by mass correction in any two or more selected planes of correction.

If a balancing machine be provided that will indicate the value and position of unbalance in each of two or more selected planes of correction without effect from unbalance in any other plane, complete balance can be obtained, such a machine indicating the resultant value of positions 67 and 68 in Figures 13 and 15.

Accordingly, the present invention relates to balance testing machines of the type arranged to indicate the unbalance in predetermined planes of correction.

Balance testing machines in general have been based upon a flexible mounting to support the motor for rotation with freedom to vibrate in at least one plane, usually the horizontal, in order that the oscillation caused by the unbalance may be indicated.

Some balance testing machines have been provided with means to pivot the rotor effectively at one selected correction plane in order to indicate unbalance in another selected plane of correction whereby the unbalanced forces in the plane of the pivot are directed to the pivot and are without effect at another correction plane, but, as the pivot is a stationary part of the frame or mounting, undesirable vibrations are transmitted to the frame causing unreliable indications, as the indicating means are a part of the stationary mounting or frame structure.

Another type of balance testing machine employing a similar flexible mounting means but without the use of a fixed pivot, uses a complex mathematical electrical net-work designed to receive electrical impulses from two generators, operable from each bearing. The two electrical impulses are fed to the complicated electrical net-work which is intended to so combine the impulses received as to give a result in proportion to the unbalance in one correction plane. These generator indicator devices are operable from the motion at the bearings, but are mounted on the frame structure and are, accordingly, subject to objectionable vibrations which may cause inaccurate indications.

Other types of balance testing machines are founded upon a mounting similar to the above, but employing mechanical systems designed to counterbalance the vibration caused by unbalance through counterbalancing mass systems variable in value and angular relation.

The present invention involves the use of freely suspended bearing supports for the rotor arranged so that the rotor may vibrate or oscillate unrestrictedly in the horizontal plane, these bearing supports being arranged for attachment thereto of relatively small, variable mass systems designed to take up vibration similar to that of the rotor, but adjustable to respond to vibrations caused by unbalance in one correction plane of the rotor without effect of unbalance in another plane. The comparatively small variable mass system is a part of the rotor and bearing support and all are free to move as a unit in space and it, therefore, comprises a pendulum suspended seismic mass substantially free from floor or building vibrations.

The variable mass system may be adjusted to respond to the unbalance in any selected plane of correction, and, therefore, one such system may be employed to respond to each of several chosen planes of correction by adjustment of the variable mass system for each plane selected.

For convenience, however, one variable mass system is, or more variable mass systems are, attached to each bearing-support and each adjusted for response to the unbalance in one selected plane of correction whereby each such system is independent of the others.

An outstanding important object of the invention is the provision of mechanical physical means to permit the accurate indication of the position and value of unbalance in one correction-plane without effect from unbalance in another plane.

Another aim of the invention is to supply a system with which the testing may be accomplished over a wide speed range in order that rotors may be tested as to balance at a speed at which they normally run in service.

The basis of this invention involves the application of inertia forces set up in the rotor by reason of the unbalance in the planes selected for correction.

In Figure 16 a rotor 71 is shown with bearings at 72 and 73 with one correction plane selected at 75 in which unbalance 76 has been attached, the rotor otherwise being in perfect balance and suspended on long, thin wires 77, attached to the bearings so that upon rotation, due to the unbalance 76, the rotor will vibrate or oscillate in the horizontal plane through which it has complete freedom of movement.

The same rotor, in a different angular position, is presented in plan view in Figure 17 with the unbalance 76 in the correction plane 75, the horizontal movement of the geometrical center line of the rotor caused by the unbalance 76, being indicated at 78, and because of the mass distribution or inertia quality of the rotor, the unbalance 76 causes such geometrical center line to move in the direction of and to the position 81 at the left hand end and in the direction of and to the position 82 at the right hand end. Therefore, the motions at bearing 72 and bearing 73 have a phase difference of 180 degrees, and also at any point of minimum or maximum amplitude of oscillation, the motions of bearings 72 and 73 are in opposite directions or 180 degrees phase difference. However, both bearing 72 and 73 have motion due to the single unbalance present in the correction plane 75. It follows, therefore, that any indication of amplitude of oscillation taken at bearing 73 would include component 83 due to unbalance 76 in plane 75, and this component 83 is acting in the opposite direction or 180 degrees from the opposite end of the rotor as at 81.

Hence, it is manifest that the component 83 must be eliminated or removed from the indication taken at bearing 73 before a true indication of the unbalance at the correction plane 85 is made.

By reference to Figure 18, the same rotor 71 is again present, excepting that the balance 76 has been removed from correction plane 75 and attached to the rotor in correction plane 85, unbalance 76 now causing oscillation amplitude 86 at the right hand end, and amplitude 87 at the left hand end, and, as before, the motions at bearing 72 and at bearing 73 are in opposite directions or have a phase difference of 180 degrees. Consequently, any indication taken at bearing 72 will include component 88 due to unbalance 76 in correction plane 85. Clearly, then, component 88 must be removed or eliminated from any indication taken at bearing 72 before a correct indication of the unbalance at correction plane 75 is made.

Turning now to Figure 19, a rotor 91 with different inertia properties is shown with the unbalance 76 attached thereto in correction plane 85 causing the amplitude of motion 92 at the right hand end and the amplitude 93 at the left hand end, the different inertia quality of this rotor having caused the intersection of the lines of motion to occur at a point to the left of bearing 72. Consequently, the motions of bearings 72 and 73 are in phase with one another as both bearings are moving in the same direction at all times and component 94 at bearing 72 due to the unbalance in plane 85 is in phase with the motion at bearing 73.

As a result, component 94 must be excluded or banished from any indication taken at 72 before a correct indication of the unbalance at the left hand correction plane 75 is made.

From the foregoing it will be appreciated that the motions at bearings 72 and 73, due to the unbalance in one correction plane, may be either in or out of phase, depending upon the inertia characteristics of the revolving rotor undergoing test.

Figure 20:
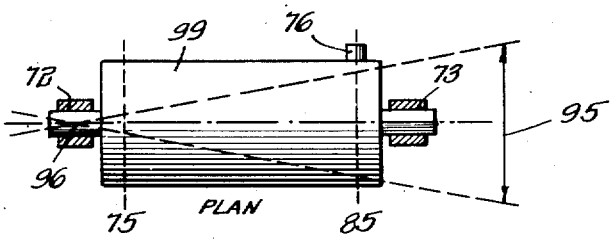

Turning now to Figure 20, wherein is shown a rotor 99 of still different inertia quality and where the unbalance 76 is attached in the correction plane 85 causing the amplitude of motion 95 at the right hand end but zero motion at bearing 72, the indications taken at point 96 of bearing 72 would not contain any component due to unbalance 76 in plane 85 but would provide reliable indication of unbalance in another correction plane, such as plane 75.

Figure 21:
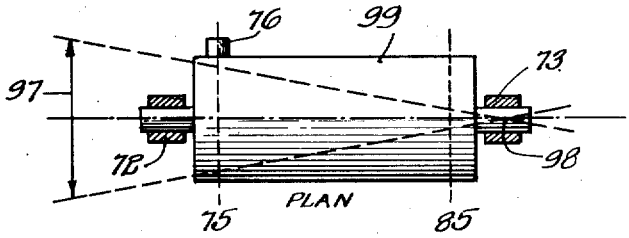

The illustration in Figure 21 is the same as that in Figure 20 except that unbalance 76 has been removed from correction plane 85 and attached to the rotor in correction plane 75 causing the amplitude of motion 97 at the left hand end but zero motion of the bearing 73, so that indications taken at point 98 of bearing 73 would not contain any component due to unbalance 76 in plane 75 and would provide reliable indications of unbalance in another correction plane, such as plane 85.

It is, therefore, apparent that the motions at bearings 72 and 73, due to unbalance in one plane, may be in phase or out of phase or one bearing may have zero motion.

The current invention provides a mass system adapted for attachment to the balance-indicating machine in a manner such that it becomes part of the pendulum rotor bearing and hanger system and is, therefore, seismic-mounted and inertia-operated and will vibrate or oscillate in phase with the point of attachment.

Figure 22:
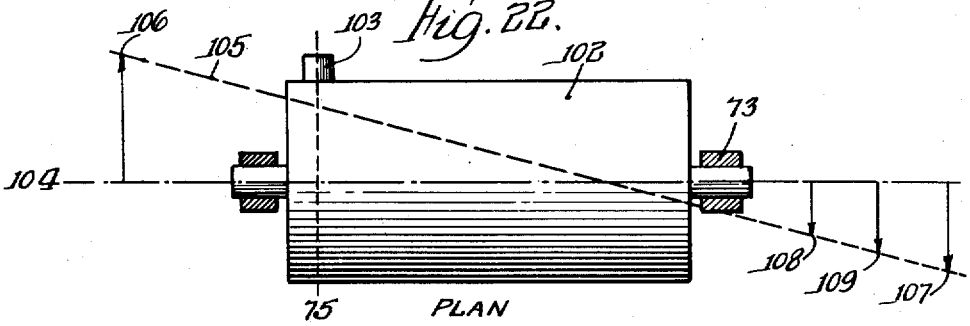

Referring to Figure 22, there is shown therein a rotor 102 with unbalance 103 inserted in correction plane 75, this unbalance causing the geometric center line 104 of the rotor to *move* [have] to position 105 which is the position of maximum amplitude of oscillation in the direction shown.

Points 106 and 107 are 180° out of phase, but points 108 and 109 are exactly in phase, point 109 having attained greater velocity than point 108 in order to reach its maximum amplitude at the same time that point 108 reaches its smaller maximum amplitude.

Figure 23:
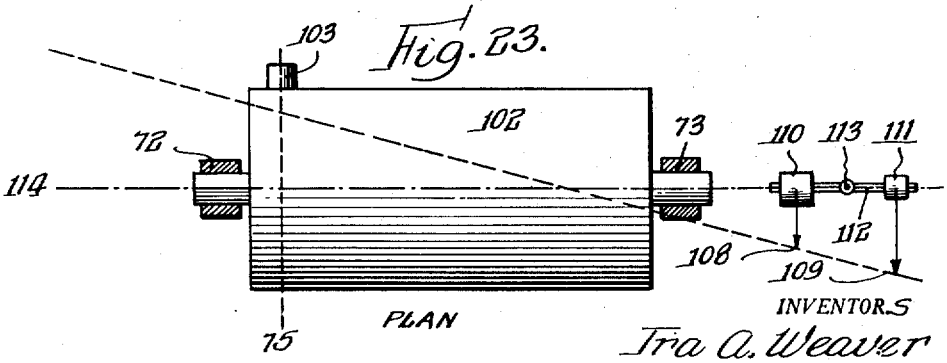

In Figure 23, the mass 110 and the smaller mass 111, shown as mounted on a common axis 112 pivoted for rotary movement about the point 113 along the geometric axis or center line 114 of the rotor, having been added to the structure presented in Figure 22, these two masses 110 and 111 having individual adjustment on their common axis 112 along the geometric center line 114 of the rotor.

If the mass 111 having a higher velocity than that of the mass 110 be adjusted along such common axis 112 toward or away from the heavier mass 110 having a lower velocity, a point of adjustment between the two masses may be found where the inertia of the smaller mass of higher velocity will equal the inertia of the larger mass of lower velocity such that zero torque would be applied about pivot 113 during the vibration or oscillation of the rotor and the two-mass axis 112 would remain parallel to the geometric center line, prolonged, of the rotor, and therefore the unbalance 103 would have zero torque effect about pivot 113.

It follows that any indicator operable from movement of the two masses about pivot 113 would provide a zero reading for any unbalance in correction plane 75 but would indicate unbalance in any other transverse plane along the geometric axis of the rotor and that the motion about pivot 113 would be in phase with, and proportional to, any unbalance in any other transverse plane, except plane 75.

The two masses 110 and 111 adjustably mounted lengthwise on a common axis 112 can be pivotally attached to either bearing 72 or bearing 73 illustrated in the foregoing figures of the drawings and adjusted to provide zero motion about pivot 113 for any unbalance in a selected correction plane whether the motions or vibrations at the bearings are in phase or out of phase, or have zero motion at the bearings.

It is further clear in the case of zero motion at the bearing as in Figure 20 or Figure 21 that one mass only, either 110 or 111 would be required and that one positioned at point 96 of Figure 20, or 98 in Figure 21.

This mass system 110, 111, 112, 113 then provides means to indicate, through the motion about the pivot 113 of Figure 23 the value of the unbalance in a selected plane of correction and its angular position or point of unbalance, without effect from unbalance in any other plane.

In the actual full size balance indicating appliance described in detail below, the rocking or vibration of this two mass system about the axis 113 is employed for operation of a piezoelectric crystal generating element some of the details of which do not of themselves constitute a part of this invention since such an appliance is known.

Figure 24:
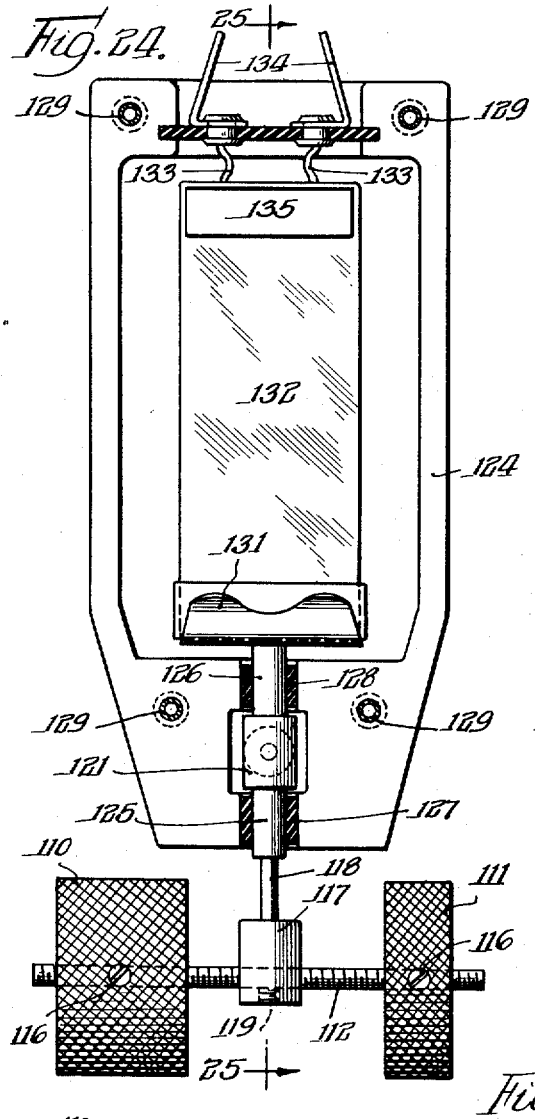
Figure 24 is a longitudinal section through one of the crystal electric generators.
Figure 25:
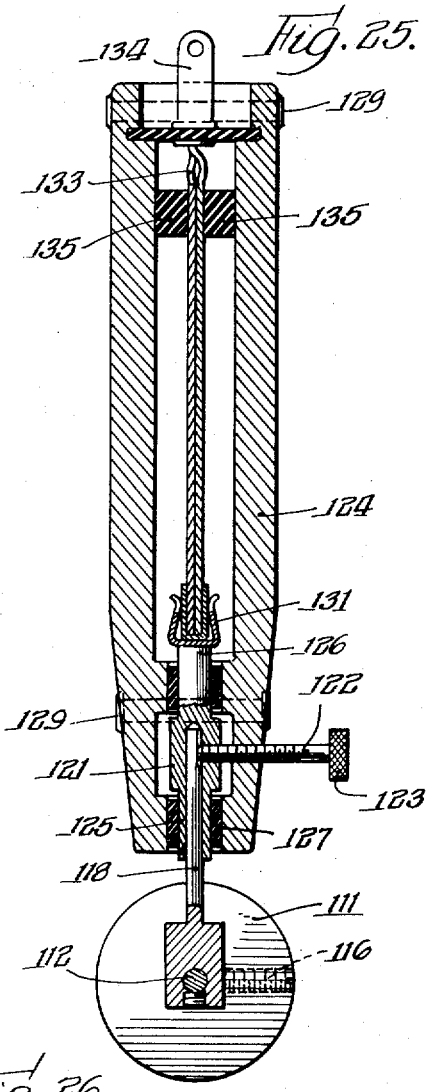
Figure 25 is a lengthwise section thereof on line 25—25 of Figure 24.

Referring to Figures 24 and 25, the two weights or masses 110 and 111 have screw threaded connections with the straight shaft or rod 112 so that they can be individually adjusted lengthwise thereon, each such weight having a set-screw 116 for maintaining it in its adjusted position. This shaft 112 extends through a transverse screw-threaded hole in the head 117 of a spindle 118, a set-screw 119 holding the part 112 fixedly in its adjusted position in such head and at right angle to the axis of the spindle. Spindle 118 fits inside of a metal member 121 (Fig. 25) in which it is demountably retained by an accessible set-screw 122, equipped with a knurled head 123, extending into a longitudinally divided housing 124.

Member 121 has two, oppositely extended, cylindrical portions 125 and 126 oscillatory respectively in rubber bearings 127 and 128 in the housing.

The two sections of the casing 124 are normally held together in assembled relation as illustrated by four, hollow rivets 129, 129 by means of which the whole appliance may be readily mounted in proper position, as by screws, not shown, extending through the rivets.

The inner end of part 126 is provided with a clamp 131 fitting over the corresponding end of the flat crystal generator 132 consisting of a pair of thin, rectangular crystals of Rochelle salt, tourmaline, quartz, or other comparable minerals joined together in known manner, the opposite end of the crystals having wires 133 connected thereto and provided with corresponding external terminals 134, 134, such end portion of the crystals being held between fixed rubber or other comparable elastic pads 135, 135, the construction being such that, when the spindle 118 is turned in either direction from its normal neutral position, the crystals are twisted and strained and by reason of which action they create a minor electric voltage and, as soon as the strain or twist is removed, the crystals automatically return to normal position by reason of the reflex action of the pads 135, 135, the crystals and the spindle being held in this neutral position by the friction of the rubber bearings 127, 128.

Figure 27:
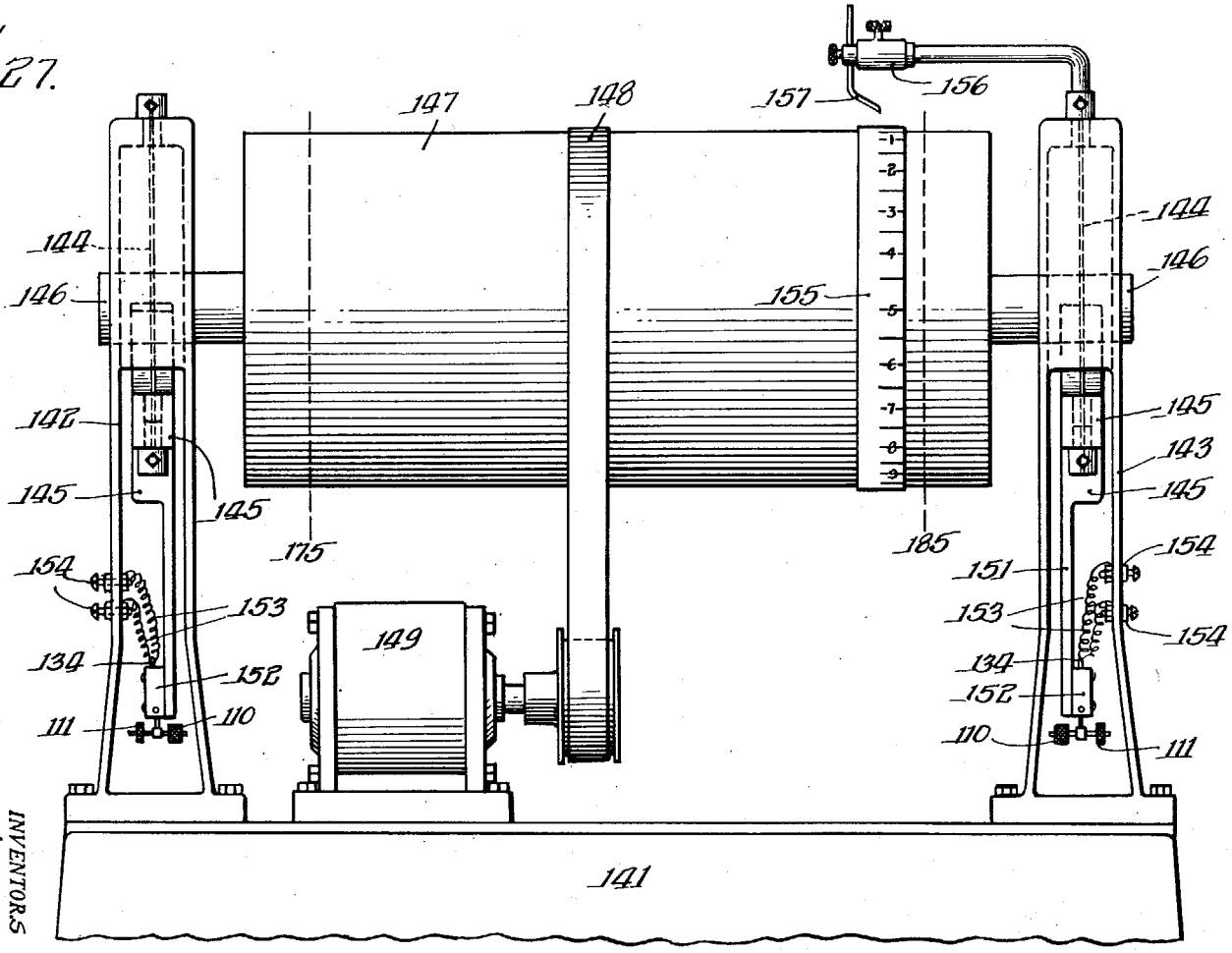
Figure 27 is a front elevation of the balance testing machine.
Figure 28:
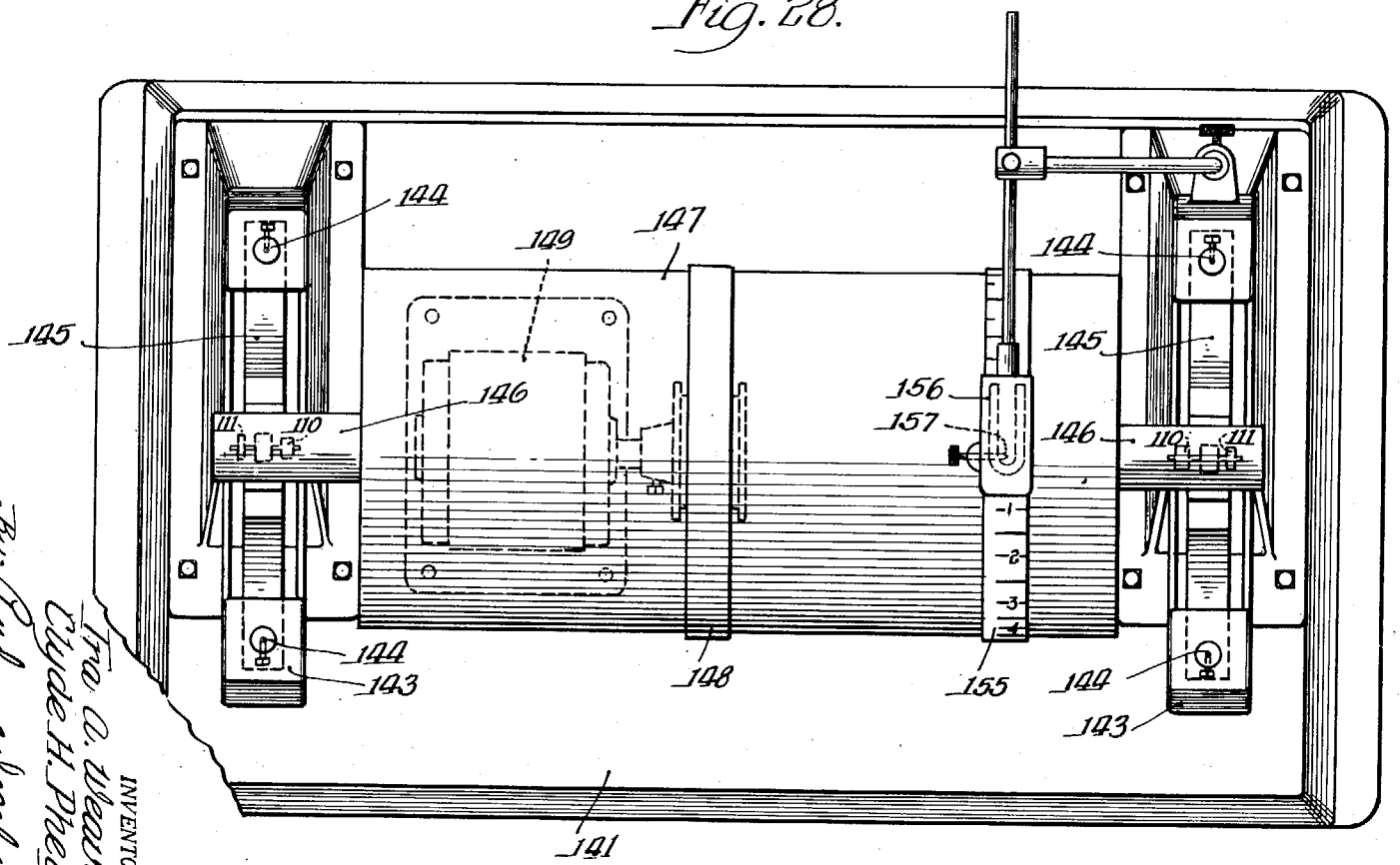
Figure 28 is a plan view of the same machine.
Figure 29:
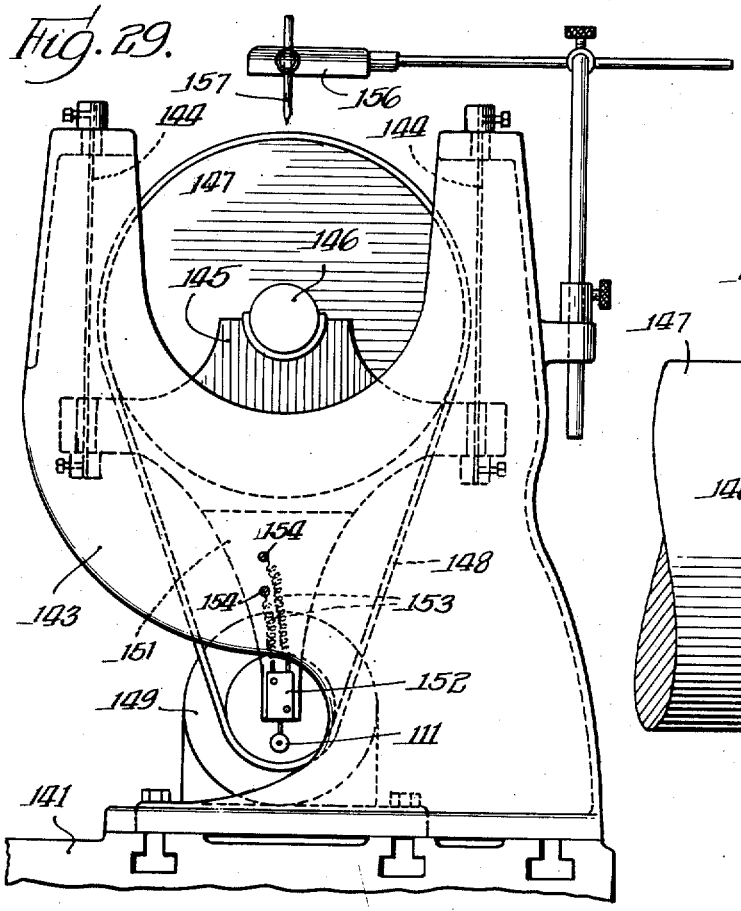
Figure 29 is an end elevation of the machine.

The balance testing machine, as presented in Figures 27, 28 and 29 includes a suitable base 141 with end standards 143, 143, of the shape depicted in Figure 29 and open at the front at 142 and each supporting a pair of depending wires 144, 144, which at their lower ends support a bearing member 145 rotatably supporting the shaft 146 of the rotor 147 to be tested as to its balance, such rotor being revolved by a belt 148 encircling it and driven by a suitable electric motor 149 on the base 141.

Each such bearing member 145 has a depending portion 151 on the lower end of which is mounted one of the two-weight crystal generating members designated as a whole 152 of the type and style presented in Figures 24 and 25, the terminals 134 of which are connected by wires 153 to electric terminals 154 on the standard 143.

A numerically graduated band 155 temporarily encircles and rotates with the rotor 147 and cooperates with the stroboscope lamp 156 and its associated fixed pointer or index 157 of known construction and operation.

Figure 26:
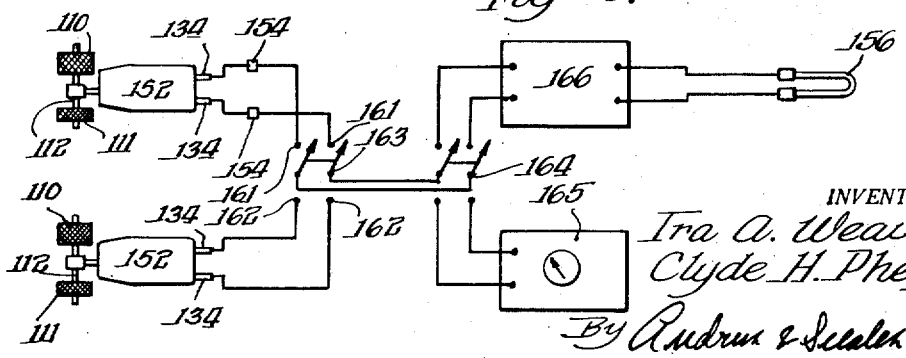
Figure 26 shows the electric circuits in which such generators are used.

Referring to Figure 26, it will be noted that the two terminals 154, 154 of one of the crystal devices 152 are connected to two electric contacts 161, 161 and the corresponding terminals 154, 154 of the other crystal generator are connected to the other two terminals 162, 162 of a double-pole double-throw electric switch, characterized as a whole 163, whose terminals are joined to a second like switch 164 which may connect with a vacuum tube voltmeter 165 or with the stroboscope control amplifier 166 operatively associated with the stroboscope-lamp 156, whereby either crystal generator may be operatively connected to the voltmeter or to the stroboscope lamp.

Preliminary to the testing of the unknown unbalance characteristics of the rotor 147, a like rotor is balanced by trial and error, after which a known unbalance weight is affixed thereto in the left hand correction plane 175, as illustrated in Figure 27, and, during the rotation of the rotor, the two weights 110 and 111 of the mass system 152 on the right hand bearing member 145 are adjusted longitudinally with respect to one another on their common rod 112 to eliminate all oscillation thereof about the axis 113 (Fig. 23) of the spindle 118 (Figs. 24 and 25) resulting in zero indication on the associated meter 165 and, after this condition has been established, such right hand mass assembly will respond to unbalance present in all transverse planes of the rotor except that in the left hand correction plane 175.

When the meter gives a zero reading as set forth above, the inertia values of the weights of different amounts are equal and there is, therefore, no tendency to twist the crystals.

When the meter indicates a value of unbalance, it is due to the fact that the two inertia forces of the two masses 110 and 111 are not the same and do not balance one another.

Then this unbalance weight may now be removed from correction plane 175 and applied to the rotor in the right hand correction plane 185 (Fig. 27) and the mass assembly at the left hand end of the machine adjusted to zero response due to such applied weight and this left hand mass assembly will now respond to unbalance in any plane except the right hand correction plane 185.

Now the right hand mass assembly will respond and twist its crystals proportionately to any unbalance attached in the right hand correction plane 185 and the left hand mass assembly will respond proportionately to any unbalance weight attached in the left hand correction plane 175, and, therefore, the indicating device 165 may be calibrated by the use of different amounts of unbalance weights to read the response of the mass system to the unbalance in either of the two selected planes 175 and 185.

Thereupon, similar or comparable rotors of unknown unbalance properties may be tested without further mass system adjustment, the volt-meter 165 giving values of unbalance, and the stroboscope lamp and its cooperating graduated band and index giving angular positions of unbalance in each of the two selected planes so that by adding or subtracting proper weight values in these planes exact balance may be readily and quickly procured.

It may be noted that, when either bearing and its associated tester 152 moves in one direction from its normal neutral position and back again to that position, it creates electric-current, by twisting of the crystals, in one direction which increases to a maximum and then back again to zero, and when it moves from its neutral position in the opposite direction and then back again to that position, it develops an opposite current up to maximum and then back to zero value. This device 152 constitutes a form of electric pickup sensitive to oscillatory motion of the rod 112 with spindle 118.

Figure 30:
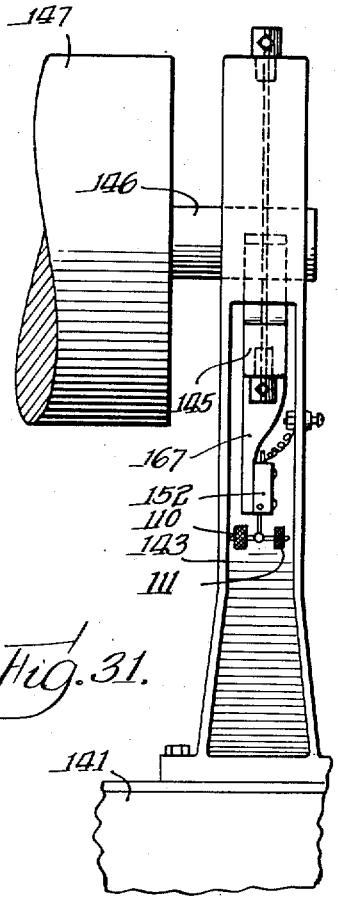
Figure 30 is a fragmentary view of a slightly modified machine.
Figure 31:
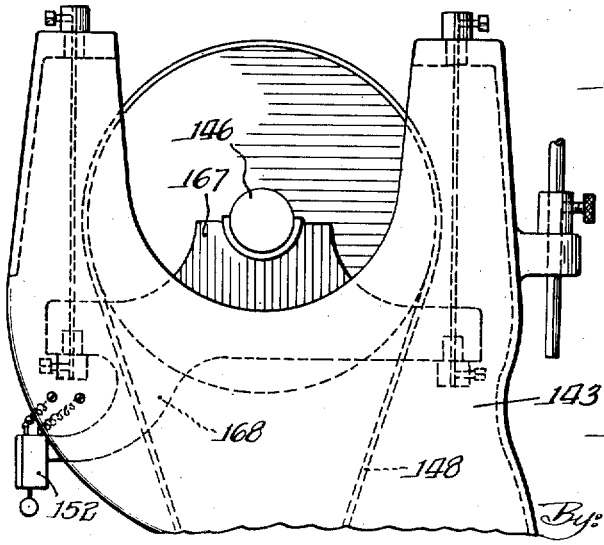
Figure 31 is a partial end view of the machine of Figure 30.

In Figures 30 and 31, a balance testing machine using somewhat different shaped bearing members 167 are shown, one only of these being illustrated. In this case such member has a forwardly extended, depending arm 168 on the front end of which the crystal generator 152 is mounted rendering the weights 110 and 111 in more favorable position for manual adjustment, but the construction operates precisely as does the other one.

Those acquainted with this art will readily understand that the invention, as defined in the appended claims, is not necessarily limited and restricted to the precise and exact details illustrated and described and that reasonable modifications may be resorted to without departure from the heart and essence of the invention and without the loss or sacrifice of any of its material benefits or advantages.

For example, the point of attachment of the mass system need not necessarily be on the bearing center line as the invention will retain all of its novel functional properties when mounted in any manner such that the horizontal longitudinal axis of the mass system is in effect subject to the same angular motion as the geometric longitudinal axis of the rotor, such as the position shown in Figure 23, where the invention is pictured far to the right of the rotor bearing and that of Figure 29 where the horizontal longitudinal axis of screw 112, Figure 24, lies in the plane parallel to the horizontal longitudinal axis of the rotor.

Further the mass 110 and the mass 111 need not be of unequal weight or size as they may be identical and any desired ratio secured by adjusting the screw 112 through the stem nut 117 providing a longer or shorter lever arm about the axis of the member 118 for either mass.

We claim:

1. Designed to coact with a machine of known type adapted to support and to rotate horizontally on its axis a rotor to be tested with freedom for lateral, substantially horizontal vibration of the rotor due to its unbalance during such rotation a balance testing system incorporating the combination of a piezoelectric crystal generator including a vertical axis pivot having means operating said generator by turning of the pivot on its axis, means mounting said pivot on said machine in a manner to subject such pivot to said lateral vibration of the rotating rotor, a longitudinal horizontal support fixed to said pivot and extending on opposite sides of said pivot parallel to the geometric axis of said rotor when such support is in its normal, neutral position, a pair of inertia weights adjustably mounted on said support on opposite sides of said pivot axis and manually adjustable longitudinally on said support toward and from one another, an electric circuit connected to said piezoelectric crystal generator, and an electric meter usable in said circuit to which the voltage created by said generator is conducted and by which it is indicated, whereby said inertia weights may be initially adjusted relative to one another to cause zero reading by said electric meter for unbalance of the revolving rotor in a selected transverse correction plane of the rotor and may be preliminarily calibrated by the employment of known weight means applied to the rotor to show the amount of unbalance in the rotor in another selected transverse correction plane of the rotor.

2. The balance testing system presented in claim 1, in which the rotor in said machine is supplied with a graduated band around it, with a stroboscopic lamp cooperating with said band, an electric circuit to supply said lamp with electric current, and means to connect said lamp circuit with the piezoelectric crystal generator whereby to permit determination of the angular position of the unbalance of the rotor in said other selected transverse correction-plane of the rotor.

3. The balance testing system presented in claim 1, in which said support for said weights on said pivot is a screw threaded rod with which screw threads on said weights permit adjustment of said weights along the rod.

4. The balance testing system set forth in claim 1, in which said weights are of different values, and in which said means supporting said weights on said pivot is a screw threaded rod with which screw threads on said weights cooperate permitting said manual adjustment of the weights along such rod.

5. The balance testing system set forth in claim 1, in which the machine set forth in the claim revolves the rotor in a pair of aligned bearings, the generator pivot being mounted on one of said bearings.

6. The balance testing system set forth in claim 1, in which said meter is a vacuum-type voltmeter.

7. The balance testing system set forth in claim 1, in which said stroboscopic-lamp has a control amplifier operatively associated with it.

8. The balance testing system presented in claim 1, in which only one of said two weights is adjustable toward and from the other companion weight.

9. Designed to coact with a machine of known type adapted to support and to rotate on its axis a rotor to be tested with freedom for lateral, substantially horizontal vibration of the rotor due to its unbalance during such rotation, a balance testing system incorporating the combination of a pair of piezoelectric crystal generators each including a vertical axis pivot having means operating its generator by turning of the pivot on its axis, each generator having means to mount its pivot on said machine in a manner to subject such pivot to said vibration of the rotating rotor, a longitudinal horizontal support fixed to each pivot and extending on opposite sides thereof and parallel to the geometrical axis of said rotor when such support is in its normal, neutral position, each such support having a pair of inertia weights adjustably mounted individually on said support on opposite sides of its pivot and each being manually adjustable longitudinally of its said support toward and from one another, each said generator having its electric circuit connected therewith, the two generators having at least one electric meter for use in said circuits to which the voltage created by said generator is conducted and by which it is indicated, whereby said inertia weight means may be initially adjusted relatively to one another in one generator to cause zero reading of the electric meter for unbalance of the revolving rotor in one selected transverse correction-plane of the latter and may be preliminarily calibrated by the employment of known weight means applied to the rotor to show the amount of unbalance in the rotor in a second selected transverse correction-plane of the rotor, and the weight means of the other generator may be initially adjusted relatively to one another to cause zero reading of the electric meter for unbalance of the revolving rotor in the second correction-plane of the latter and may be preliminarily calibrated by the employment of known weight means applied to the rotor to show the amount of unbalance in the rotor in the first correction-plane of the rotor.

10. The balance testing system set forth in claim 1 which incorporates two such piezoelectric crystal generators each having all of the properties and characteristics presented in such claim but cooperative nevertheless with the two different correction-planes of the rotor.

11. The balance testing system presented in claim 9, in which the rotor in the machine is supplied with a graduated band around it with a stroboscope-lamp cooperating with said band, an electric circuit to supply said lamp with electric current, and means to connect said lamp circuit individually with each of the piezo-electric crystal generators whereby to permit determination of the angular position of the unbalance of the rotor in each of the two selected transverse correction-planes of the rotor.

12. The balance testing system set forth in claim 1 which incorporates two such piezoelectric crystal generators each having all of the properties and characteristics presented in such claim but cooperative nevetheless with the two different correction-planes of the rotor, the rotor having in said machine a graduated band around it, with a stroboscopic-lamp cooperating with said band, an electric circuit to supply said lamp with electric current, and means to connect said lamp circuit individually with each piezoelectric crystal generator whereby to permit determination of the angular position of the unbalance of the rotor in said two selected transverse correction-planes of the rotor.

13. A balance tester, designed to coact with a balance testing machine of known type adapted to support and to rotate a rotor to be tested with freedom for lateral vibration in a predetermined plane due to imbalance in the rotating rotor, said tester including a pivot member, means to mount said pivot member on said testing machine to vibrate in agreement with the vibration of the geometric axis of the rotor in said predetermined plane, the axis of said pivot member being substantially at right angles to said predetermined plane of vibration of the rotor, inertia weight means, means mounting said inertia weight means on said pivot member upon opposite sides of the axis thereof, and with manual adjustment of at least one of said weight means toward and from said pivot axis, the longitudinal axis of said means for mounting said inertia weight means extending substantially parallel with the rotor axis in its neutral position, and indicating means actuated by the oscillation of said pivot member occasioned by said weight means whereby said weight means may be preliminarily adjusted relative to one another to cause zero reading of said indicating means for unbalance in the rotating rotor in a selected transverse correction plane of the latter, and may be preliminarily calibrated to show the amount of unbalance of the rotor in another selected transverse correction plane through the rotor.

14. The combination in a balance tester set forth in claim 13 in which said weight means is two weights of different amounts.

15. The combination in a balance tester set forth in claim 13 in which said weight means is two weights, and in which said means mounting said weight means on said pivot member is a screw threaded rod permitting the specified adjustment.

16. The combination in a balance tester set forth in claim 13 in which said weight means is two weights of different values and in which said means mounting said weight means on said pivot member is a screw threaded rod permitting the manual adjustment of said two weights.

17. The combination in a balance tester set forth in claim 13 in which said indicating means includes an electric current operated indicator and a circuit for said indicator, and means for generating impulses of current in said circuit, said means being responsive to oscillation of said pivot member.

18. The combination in a balance tester set forth in claim 13 in which said indicating means includes an electric circuit containing a current operated indicator and a piezo-electric crystal generator connected to and operating said indicator and actuated by the oscillation of said pivot.

19. For use with a balance testing machine adapted to rotate a rotor in a pair of bearings with freedom for horizontal lateral vibration due to unbalance in the rotating rotor, balance testing means comprising the combination of a pivot member, means to mount said pivot member on one of said bearings to vibrate in agreement with the transverse vibration of said bearings, the axis of said pivot member being substantially at right angles to the plane of vibration of said bearings, inertia weight means, means mounting said weight means on said pivot member on opposite sides of its axis and with manual adjustment of at least one of said weight means toward and from the axis of said pivot member, the longitudinal axis of said means for mounting said inertia weight means extending substantially parallel with the rotor axis in its neutral position, and indicating means controlled by the oscillation of said pivot member occasioned by said weight means, whereby said weight means may by preliminarily adjusted relative to said pivot member to cause zero reading of said indicating means for unbalance in the rotating rotor in a selected transverse correction plane of the latter other than the transverse plane of the bearing on which said pivot member is mounted, and may be preliminarily calibrated to show the amount of unbalance of the rotor in another selected transverse correction plane of the rotor other than that of the bearing on which said pivot member is mounted.

20. The balance testing means set forth in claim 19 in which said inertia weight means is two weights of unequal values and in which said indicating means includes an electrically operated indicator specifying the status of said rotor, an electric circuit for said indicator, and an electric current impulse generating means in said circuit actuated by the oscillation of said pivot member.

21. In a machine of the class described, a support comprising bearings for a rotor to be tested permitting the axis of the rotor to swing vibrationally in a horizontal plane of vibration and to carry the bearings with it, an extension on one of said bearings, an inertia device mounted on said extension and comprising a pivot member having a vertical axis, a horizontal rod carried on said pivot member and having its longitudinal axis substantially parallel to the axis of the rotor in its neutral position, inertia weights of different masses carried on the rod on opposite sides of the pivot member, at least one of said weights being adjustable as to distance from the pivot member, and means sensitive to oscillation of said weights and rod about said pivot axis for indicating unbalance of the rotor.

22. In a device of the class described, a pair of bearings for rotatably supporting the ends of one of a number of rotors to be subjected to analysis, said bearings being supported to permit vibrational swing of the ends of the rotor in a single plane of vibration and to participate in said vibrational swing, a vibration detecting means associated with each bearing, each detecting means being connected with its associated bearing to participate in the vibrational swing of said bearing and comprising a pivot member disposed at right angles to the plane of vibration, a rod supported intermediate its ends on said pivot member, said rod being disposed with its longitudinal axis extending substantially parallel with the rotor axis in its neutral position, inertia weights mounted on said rod on opposite sides of the pivot member, an electric pickup device sensitive to the oscillation of the rod about its pivot, indicating means for indicating the degree of unbalance of a rotor in each of two transverse correction planes intersecting the rotor adjacent the corresponding bearings, indicating means for indicating the angular position of unbalanced forces in each of said correction planes, and an electric circuit and switches for connecting each of the electric pickups with each of said indicating means whereby the electric pickups govern the response of each of said indicating means.

*23. In a machine of the class described for indicating the unbalance of a rotor by utilizing forces resulting from unbalance vibrations of the rotor during rotation, a support for an unbalanced rotor permitting vibratory motion thereof about a point, a vibration pick-up device mounted rigidly on said rotor support to receive said vibratory motion of the rotor and comprising a frame secured to said rotor support, inertia-weight means, means carried by said frame and supporting said inertia-weight means for rotational oscillation upon a substantially fixed pivotal axis extending transverse to the direction of said vibratory motion, the mass of said inertia-weight means having some portion thereof on each side of said last named axis relative to the direction of force tending to vibrate the axis to provide an effective moment arm for each portion of said inertia-weight means extending at an angle to a plane normal to the axis of the rotor, and means to adjust the corresponding effective moment of at least one of said portions to provide a differential moment whereby a selected reference plane may be established for the rotor wherein unbalance in such plane does not oscillate the inertia-weight means and the latter is responsive only to rotor unbalance outside of said reference plane, resilient means coacting with said frame to bias said inertia-weight means to a predetermined normal position fixed relative to the direction of the effective vibratory force, and means responsive to the rotational oscillation of said inertia-weight means for indicating unbalance of the rotating rotor outside of said reference plane.*

*24. In a machine of the class described for indicating the unbalance of a rotor by utilizing forces resulting from unbalance vibrations of the rotor during rotation, a pair of bearing members to support an unbalanced rotor for vibratory motion thereof about a point, a vibration pick-up device mounted rigidly on each said bearing member to receive said vibratory motion of the rotor and each comprising a frame secured to the corresponding bearing member, inertia-weight means, means carried by said frame and supporting said inertia-weight means for rotational oscillation upon a substantially fixed pivotal axis extending transverse to the direction of said vibratory motion, the mass of each said inertia-weight means having some portion thereof on each side of the corresponding axis relative to the direction of force tending to vibrate the axis to provide an effective moment arm for each portion of said inertia-weight means extending at an angle to a plane normal to the axis of the rotor, resilient means coacting with the corresponding frame to bias each said inertia-weight means to a predetermined normal position, means to adjust said inertia-weight means to vary the effective moment thereof about the corresponding pivotal axis whereby each inertia-weight means is free from rotational oscillation resulting from unbalance forces lying in a different one of two predetermined reference planes normal to the rotor axis and responds to unbalance forces in said rotor external to said corresponding reference plane as related to a predetermined unbalance in the other of said reference planes, and means responsive to the rotational oscillation of each said inertia-weight means for indicating the amount of correction to be applied in the respective reference planes of the rotor and the location for such correction circumferentially of the rotor.*

*25. The machine of claim 23 in which the unbalance indicating means is calibrated to indicate the apparent unbalance in a second reference plane which is the resultant of all unbalance outside said first reference plane for the rotor undergoing test.*

*26. The machine of claim 23 in which the inertia-weight means comprises two weight masses disposed on opposite sides of the pivotal axis therefor and adjustably spaced apart.*

*27. The machine of claim 23 in which the inertia-weight means comprises a threaded rod supported transversely of said fixed pivotal axis and at least one weight threaded upon each end of the rod for adjustment theron.*

IRA A. WEAVER.
CLYDE H. PHELPS.

References Cited in the file of this patent

UNITED STATES PATENTS

| Number | Name | Date |
|---|---|---|
| 1,704,341 | Rathbone | Mar. 5, 1929 |
| 1,727,991 | Kimball, Jr., et al. | Sept. 10, 1929 |
| 2,023,244 | Schnaitter | Dec. 3, 1935 |
| 2,050,073 | Thearle | Aug. 4, 1936 |
| 2,092,096 | Swedlund | Sept. 7, 1937 |
| 2,131,602 | Thearle | Sept. 27, 1938 |
| 2,191,862 | Sarazin | Feb. 27, 1940 |
| 2,293,371 | Van De Grift | Aug. 18, 1942 |
| 2,301,291 | Kolesnik | Nov. 10, 1942 |
| 2,302,670 | Buchanan | Nov. 24, 1942 |
| 3,363,303 | Ehrgott et al. | Nov. 21, 1944 |
| 2,382,673 | Sihvonen et al. | Aug. 14, 1945 |
| 2,382,843 | Annis | Aug. 14, 1945 |
| 2,411,401 | Welch | Nov. 19, 1946 |
| 2,426,305 | Hope | Aug. 26, 1947 |

FOREIGN PATENTS

| Number | Country | Date |
|---|---|---|
| 473,636 | Great Britain | Oct. 18, 1937 |